(12) United States Patent
Li et al.

(10) Patent No.: US 12,241,739 B1
(45) Date of Patent: Mar. 4, 2025

(54) BIDIRECTIONAL LITTROW TWO-DEGREE-OF-FREEDOM GRATING INTERFERENCE MEASUREMENT DEVICE BASED ON DOUBLE GRATINGS

(71) Applicant: Changchun Institute of Optics, Fine Mechanics and Physics, Chinese Academy of Sciences, Changchun (CN)

(72) Inventors: Wenhao Li, Changchun (CN); Wenyuan Zhou, Changchun (CN); Zhaowu Liu, Changchun (CN); Yujia Sun, Changchun (CN); Lin Liu, Changchun (CN)

(73) Assignee: Changchun Institute of Optics, Fine Mechanics and Physics, Chinese Academy of Sciences, Changchun (CN)

( * ) Notice: Subject to any disclaimer, the term of this patent is extended or adjusted under 35 U.S.C. 154(b) by 0 days.

(21) Appl. No.: 18/896,369

(22) Filed: Sep. 25, 2024

(30) Foreign Application Priority Data

Dec. 8, 2023 (CN) .......................... 202311681756.2

(51) Int. Cl.
*G01B 9/02015* (2022.01)
*G01B 9/02* (2022.01)
*G01B 9/02001* (2022.01)
*G01B 11/02* (2006.01)

(52) U.S. Cl.
CPC ..... *G01B 9/02015* (2013.01); *G01B 9/02007* (2013.01); *G01B 9/02045* (2013.01); *G01B 11/02* (2013.01); *G01B 2290/30* (2013.01); *G01B 2290/70* (2013.01)

(58) Field of Classification Search
CPC ............ G01B 9/02007; G01B 9/02015; G01B 9/02045; G01B 2290/30; G01B 2290/70
See application file for complete search history.

(56) References Cited

U.S. PATENT DOCUMENTS

| 5,666,196 A | * | 9/1997 | Ishii | ........................ | G01D 5/38 |
| | | | | | 250/237 G |
| 5,742,391 A | * | 4/1998 | Kaneda | .................... | G01D 5/38 |
| | | | | | 250/237 G |
| 8,243,279 B2 | * | 8/2012 | Ishizuka | .................. | G01D 5/38 |
| | | | | | 356/499 |

(Continued)

FOREIGN PATENT DOCUMENTS

CN 115824061 A * 3/2023

*Primary Examiner* — Michael A Lyons
(74) *Attorney, Agent, or Firm* — Westbridge IP LLC

(57) ABSTRACT

A bidirectional Littrow two-degree-of-freedom grating interference measurement device based on double gratings includes a transmission two-dimensional grating and a reflection two-dimensional grating. A dual-frequency laser emitted by a light source passes through the transmission two-dimensional grating with a specific grating pitch to form four beams in X direction and Y direction, the four beams are incident on the reflection two-dimensional grating at a Littrow angle, and the four beams diffracted by the reflection two-dimensional grating return to the transmission two-dimensional grating in an incidence direction along the same path; different orders of transmission light of the four beams of light in different directions may form stable interference signals carrying displacement information, and the stable interference signals are received by a detector.

4 Claims, 3 Drawing Sheets

(56) References Cited

U.S. PATENT DOCUMENTS

2011/0235051 A1\* 9/2011 Huber ................ G01D 5/34746
                                                           356/498
2012/0194824 A1\* 8/2012 de Groot ............ G01B 9/02003
                                                           356/482

\* cited by examiner

BIDIRECTIONAL LITTROW TWO-DEGREE-OF-FREEDOM GRATING INTERFERENCE MEASUREMENT DEVICE BASED ON DOUBLE GRATINGS

CROSS-REFERENCE TO RELATED APPLICATIONS

This application claims priority to Chinese Patent Application No. 202311681756.2, filed on Dec. 8, 2023, the content of which is incorporated herein by reference in its entirety.

TECHNICAL FIELD

The present disclosure relates to the field of grating interference measurement technology, and in particular to a bidirectional Littrow two-degree-of-freedom grating interference measurement device based on double gratings.

BACKGROUND

At present, high-precision displacement measurement technology mainly includes laser interferometry and grating interferometry. A measurement basis of the laser interferometry is a laser wavelength, and its disadvantage is that it is sensitive to a refractive index of air and has strict requirements on external environmental conditions. The laser interferometry is easy to achieve high precision under a short stroke. However, as a measurement stroke gradually increases, slight changes in a measurement environment such as temperature, humidity and air pressure may seriously affect the accuracy of measurement results, and a measurement error in a case of stroke above meter level may even reach several hundred nanometers. To achieve a high-precision measurement using a laser interferometer, a high-level environmental control system is required.

A measurement basis of the grating interferometry is a grating pitch, and a grating substrate may be made of a zero expansion material. Compared to a wavelength, an external environment has little influence on the measurement, a measurement accuracy is almost unaffected by the increase in stroke, and it does not require a strict environmental control such as constant temperature, constant pressure, and constant humidity, which may greatly reduce requirements of a measurement system for the environment. In view of the above advantages, there is an urgent demand for the application of grating interference displacement measurement device in high-end computer numerical control machine tools and aerospace fields.

In existing grating interferometer two-degree-of-freedom measurement system, polarization optical elements are used to construct an optical path, which may cause two problems. Firstly, the use of polarization beam splitting prisms or wave plates may bring unavoidable periodic nonlinear errors to the optical path, which may restrict a further improvement of displacement measurement accuracy. Secondly, a large number of prisms or wave plates may result in a very complicated system structure, and those elements may restrict a miniaturization and integration of the overall device.

SUMMARY

In order to solve the above problems, the present disclosure provides a bidirectional Littrow two-degree-of-freedom grating interference measurement device based on double gratings, in which no polarization beam splitting prisms or wave plates are used, and only two diffraction gratings are used to build the system, so that a periodic nonlinear error introduced by optical elements may be eliminated, and an integration of the system may be achieved.

The bidirectional Littrow two-degree-of-freedom grating interference measurement device based on double gratings provided in the present disclosure includes a light source, a transmission two-dimensional grating, a reflection two-dimensional grating, an X-direction quarter-wave plate, a Y-direction quarter-wave plate, a first optical system, a second optical system, a third optical system, and a fourth optical system, where the light source is a dual-frequency laser configured to generate an X-direction measurement laser beam and a Y-direction measurement laser beam having a frequency $f_1$ and a frequency $f_2$ respectively, and a polarization state of the X-direction measurement laser beam is perpendicular to a polarization state of the Y-direction measurement laser beam.

$+1^{st}$ order diffracted light obtained by vertically injecting the X-direction measurement laser beam into the transmission two-dimensional grating passes through the X-direction quarter-wave plate and is incident on the reflection two-dimensional grating at a Littrow angle to obtain new $+1^{st}$ order diffracted light, and the new $+1^{st}$ order diffracted light passes through the X-direction quarter-wave plate and returns to the transmission two-dimensional grating in a direction of the $+1^{st}$ order diffracted light to obtain $0^{th}$ order diffracted light and $-2^{nd}$ order diffracted light, so that horizontal polarization light having the frequency $f_1$ in the $0^{th}$ order diffracted light and the $-2^{nd}$ order diffracted light generated by the new $+1^{st}$ order diffracted light is converted into vertical polarization light, and vertical polarization light having the frequency $f_2$ in the $0^{th}$ order diffracted light and the $-2^{nd}$ order diffracted light generated by the new $+1^{st}$ order diffracted light is converted into horizontal polarization light.

$-1^{st}$ order diffracted light obtained by vertically injecting the X-direction measurement laser beam into the transmission two-dimensional grating is incident on the reflection two-dimensional grating at a Littrow angle to obtain new $-1^{st}$ order diffracted light, and the new $-1^{st}$ order diffracted light returns to the transmission two-dimensional grating in a direction of the $-1^{st}$ order diffracted light to obtain $0^{th}$ order diffracted light and $-2^{nd}$ order diffracted light after diffraction by the transmission two-dimensional grating.

The first optical system is configured to filter out a stable interference signal of a horizontal component in the $-2^{nd}$ order diffracted light generated by the new $+1^{st}$ order diffracted light and the $0^{th}$ order diffracted light generated by the new $-1^{st}$ order diffracted light, so that diffracted light of a vertical component having the frequency $f_2$ and diffracted light of the vertical component having the frequency $f_2$ form a stable interference.

The second optical system is configured to filter out a stable interference signal of a vertical component in the $-2^{nd}$ order diffracted light generated by the new $-1^{st}$ order diffracted light and the $0^{th}$ order diffracted light generated by the new $+1^{st}$ order diffracted light, so that diffracted light of a horizontal component having the frequency $f_2$ and diffracted light of the horizontal component having the frequency $f_1$ form a stable interference.

A stable interference signal obtained in the first optical system and a stable interference signal obtained in the second optical system are processed to obtain a displacement change of the reflection two-dimensional grating in the X direction.

Further, a phase change $\phi_x$ caused by a displacement of the reflection two-dimensional grating in the X direction is obtained according to:

$$\phi_x = \frac{2\pi m \cdot S_x}{d},$$

where $S_x$ represents a theoretical displacement of the reflection two-dimensional grating in the X direction, m represents an order of the diffracted light obtained after the X-direction measurement laser beam has passed through the transmission two-dimensional grating, and d represents a grating pitch of the transmission two-dimensional grating and the reflection two-dimensional grating.

When the order m is equal to +1 and −1 respectively, a Doppler frequency shift phase value $\phi_1$ of the $+1^{st}$ order diffracted light and a Doppler frequency shift phase value $\phi_2$ of the $-1^{st}$ order diffracted light are obtained according to:

$$\begin{cases} \phi_1 = \frac{2\pi \cdot S_x}{d} \\ \phi_2 = -\frac{2\pi \cdot S_x}{d} \end{cases}.$$

A displacement change $S_x$ of the reflection two-dimensional grating in the X direction is obtained according to:

$$2 \times (\phi_1 - \phi_2) = \phi;$$

$$S_x = \frac{d}{8\pi} \cdot \phi;$$

where $\phi$ represents the phase change of the $+1^{st}$ order diffracted light and the $-1^{st}$ order diffracted light; and when the phase change $\Phi$ is $2\pi$, $S_x = d/4$, and the interference measurement device has a 4-fold optical subdivision.

Further, an optical path of the Y-direction measurement laser beam passing through the transmission two-dimensional grating, the reflection two-dimensional grating and the Y-direction quarter-wave plate, a method of generating corresponding diffracted light from the Y-direction measurement laser beam, and a method performed by the third optical system and the fourth optical system for the corresponding diffracted light are consistent with a method performed in the first optical system and the second optical system, and a displacement change $S_y$ of the reflection two-dimensional grating in the Y direction is obtained according to:

$$S_y = \frac{d}{8\pi} \cdot \phi.$$

Further, the first optical system and the third optical system have the same structure each including a polaroid sheet configured to remove the stable interference signal of the horizontal component and a photodetector configured to receive the stable interference signal of the vertical component; and the second optical system and the fourth optical system have the same structure each including a polaroid sheet configured to remove the stable interference signal of the vertical component and a photodetector configured to receive the stable interference signal of the horizontal component.

Compared with the related art, the present disclosure may achieve the following beneficial effects.

Firstly, two diffraction gratings are used to build the system to avoid periodic nonlinear errors caused by using too many optical elements, and no plane mirrors are used in the system, so that an error caused by a double angle effect is eliminated and an angle sensitivity is reduced.

Secondly, fewer optical elements are used to achieve the integration of the device.

Lastly, in the device, it is possible to replace the polaroid sheet by other optical elements (such as a polarizer) according to actual needs while maintaining the same measurement principle, thereby improving the flexibility and practicality of the device.

DETAILED DESCRIPTION OF EMBODIMENTS

In order to make the purpose, technical solutions and advantages of the present disclosure more clearly understood, the present disclosure will be further described in detail below in conjunction with the accompanying drawings and specific embodiments. It should be understood that the specific embodiments described herein are only used to explain the present disclosure and do not constitute limitations to the present disclosure.

Figure 1:
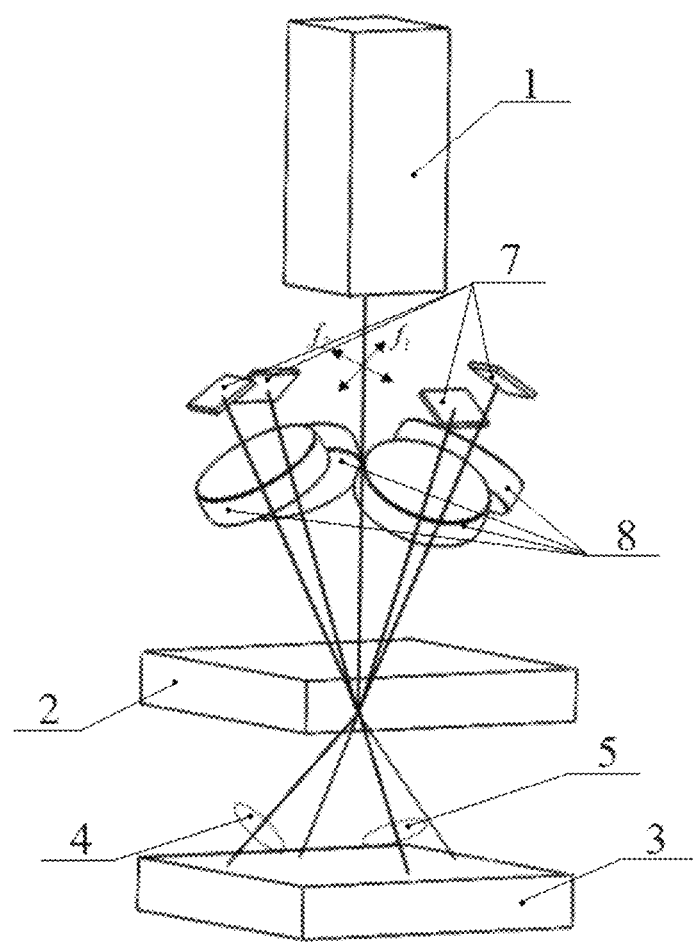
FIG. 1 shows a schematic structural diagram of a bidirectional Littrow two-degree-of-freedom grating interference measurement device based on double gratings according to an embodiment of the present disclosure.

FIG. 1 shows a structure of a bidirectional Littrow two-degree-of-freedom grating interference measurement device based on double gratings according to an embodiment of the present disclosure.

As shown in FIG. 1, the bidirectional Littrow two-degree-of-freedom grating interference measurement device based on double gratings provided by the present disclosure includes a light source 1, a transmission two-dimensional grating 2, a reflection two-dimensional grating 3, an X-direction quarter-wave plate 4, a Y-direction quarter-wave plate 5, a first optical system, a second optical system, a third optical system, and a fourth optical system.

The light source 1 is a dual-frequency laser, which is used to generate X-direction measurement laser beams with frequencies f1 and f2 respectively that have mutually perpendicular polarization states and Y-direction measurement laser beams with frequencies f1 and f2 respectively that have mutually perpendicular polarization states. The transmission two-dimensional grating 2 and the reflection two-dimensional grating 3 are placed in parallel on a path of the X-direction measurement laser beam and the Y-direction measurement laser beam emitted by the light source 1, and the transmission two-dimensional grating 2 and the reflection two-dimensional grating 3 are perpendicular to the X-direction measurement laser beam and the Y-direction measurement laser beam. The X-direction quarter-wave plate 4 and the Y-direction quarter-wave plate 5 are located between the transmission two-dimensional grating 2 and the reflection two-dimensional grating 3, and on the paths of the diffracted light generated by the transmission two-dimensional grating 2 and the reflected light generated by the reflection two-dimensional grating 3.

The first optical system and the third optical system have the same structure, each including a polaroid sheet 6 used to remove a stable interference signal of a horizontal component and a photodetector 7 used to receive a stable interference signal of a vertical component. The second optical system and the fourth optical system have the same structure, each including a polaroid sheet 6 used to remove a stable interference signal of a vertical component and a photodetector 7 used to receive a stable interference signal of a horizontal component.

In the bidirectional Littrow two-degree-of-freedom grating interference measurement device based on double gratings proposed in the present disclosure, the polaroid sheet 6 may be replaced by a polarizer 8 according to actual needs, and corresponding changes may be made to the structure of the measurement device proposed in the present disclosure according to the polarizer 8.

First Specific Embodiment

Figure 2A:
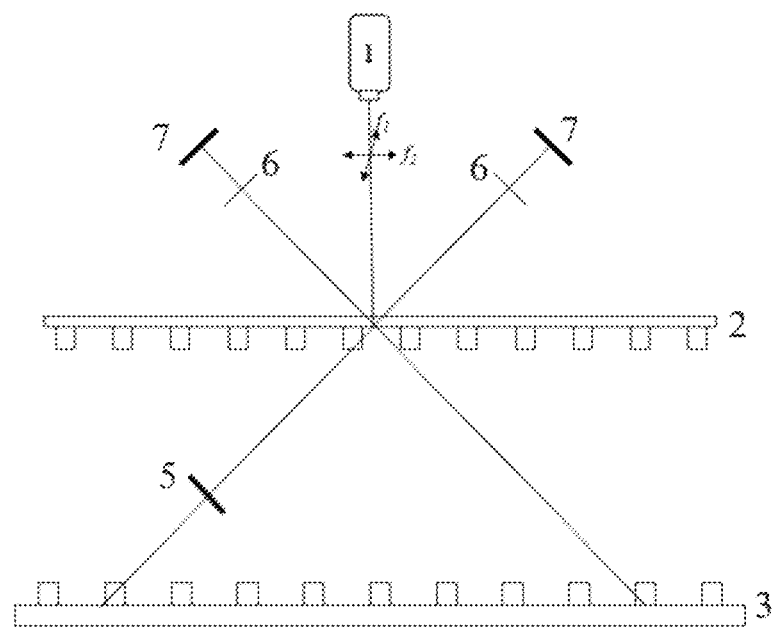
FIG. 2a shows a schematic diagram of a principle of a bidirectional Littrow two-degree-of-freedom grating interference measurement device based on double gratings in the x-z direction according to an embodiment of the present disclosure.
Figure 2B:
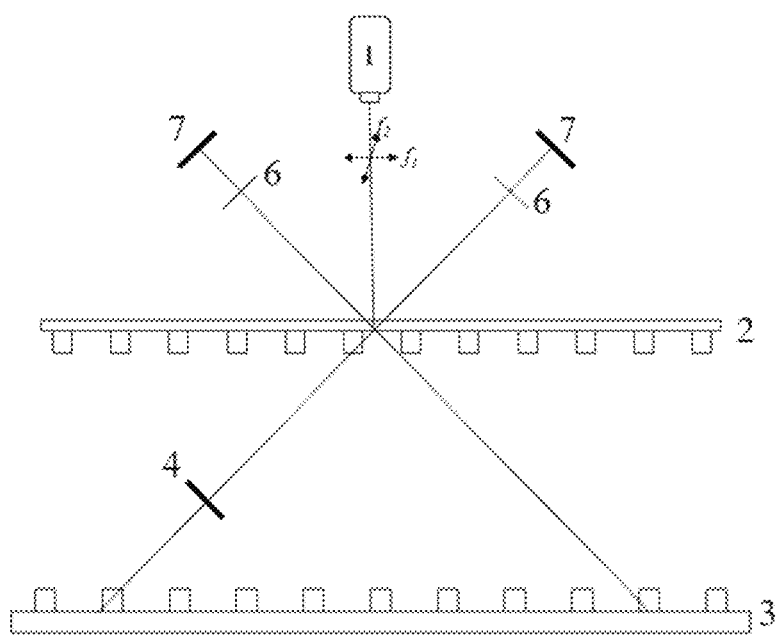
FIG. 2b shows a schematic diagram of a principle of a bidirectional Littrow two-degree-of-freedom grating interference measurement device based on double gratings in the y-z direction according to an embodiment of the present disclosure.

FIG. 2a and FIG. 2b respectively show principles of the bidirectional Littrow two-degree-of-freedom grating interference measurement device based on double gratings in the x-z direction and the y-z direction when a polaroid sheet is used.

As shown in FIG. 2a, $+1^{st}$ order diffracted light obtained by vertically injecting the X-direction measurement laser beam into the transmission two-dimensional grating 2 passes through the X-direction quarter-wave plate 5 and is incident on the reflection two-dimensional grating 3 at a Littrow angle to obtain new $+1^{st}$ order diffracted light, and the new $+1^{st}$ order diffracted light passes through the X-direction quarter-wave plate 5 and returns to the transmission two-dimensional grating 2 in a direction of the $+1^{st}$ order diffracted light to obtain X-direction diffracted light, so that horizontal polarization light having the frequency $f_1$ in $0^{th}$ order diffracted light and $-2^{nd}$ order diffracted light generated from the new $+1^{st}$ order diffracted light is converted into vertical polarization light, and vertical polarization light having the frequency $f_2$ in the $0^{th}$ order diffracted light and the $-2^{nd}$ order diffracted light generated from the new $+1^{st}$ order diffracted light is converted into horizontal polarization light.

$-1^{st}$ order diffracted light obtained by vertically injecting the X-direction measurement laser beam into the transmission two-dimensional grating 2 is incident on the reflection two-dimensional grating 3 at a Littrow angle to obtain new $-1^{st}$ order diffracted light, and the new $-1^{st}$ order diffracted light returns to the transmission two-dimensional grating 2 in a direction of the $-1^{st}$ order diffracted light to obtain $0^{th}$ order diffracted light and $-2^{nd}$ order diffracted light after diffraction by the transmission two-dimensional grating 2.

The polaroid sheet 6 in the first optical system may filter out a stable interference signal of a horizontal component in the $-2^{nd}$ order diffracted light generated from the new $+1^{st}$ order diffracted light and the $0^{th}$ order diffracted light generated from the new $-1^{st}$ order diffracted light, so that diffracted light of a vertical component having the frequency $f_2$ and diffracted light of the vertical component having the frequency $f_1$ form a stable interference in the photodetector 7 of the first optical system.

The polaroid sheet 6 in the second optical system may filter out a stable interference signal of a vertical component in the $-2^{nd}$ order diffracted light generated from the new $-1^{st}$ order diffracted light and the $0^{th}$ order diffracted light generated from the new $+1^{st}$ order diffracted light, so that diffracted light of the horizontal component having the frequency $f_2$ and diffracted light of the horizontal component having the frequency $f_1$ form a stable interference in the photodetector 7 of the second optical system, and then a displacement change of the reflection two-dimensional grating 3 in the X direction may be obtained.

A phase change $\phi_x$ caused by a displacement of the reflection two-dimensional grating 3 in the X direction may be obtained according to:

$$\phi_x = \frac{2\pi m \cdot S_x}{d}$$

where $S_x$ represents a theoretical displacement of the reflection two-dimensional grating 3 in the X direction, m represents an order of the diffracted light obtained after the X-direction measurement laser beam has passed through the transmission two-dimensional grating 2, and d represents a grating pitch of the transmission two-dimensional grating 2 and the reflection two-dimensional grating 3.

When the order m is equal to +1 and −1 respectively, a Doppler frequency shift phase value $\phi_1$ of the $+1^{st}$ order diffracted light and a Doppler frequency shift phase value $\phi_2$ of the $-1^{st}$ order diffracted light may be obtained according to:

$$\begin{cases} \phi_1 = \frac{2\pi \cdot S_x}{d} \\ \phi_2 = -\frac{2\pi \cdot S_x}{d} \end{cases}$$

A displacement change $S_x$ of the reflection two-dimensional grating 3 in the X direction is then obtained according to:

$$2 \times (\phi_1 - \phi_2) = \phi;$$

$$S_x = \frac{d}{8\pi} \cdot \phi;$$

where $\phi$ represents the phase change of the $+1^{st}$ order diffracted light and the $-1^{st}$ order diffracted light. When the phase change $\phi$ is $2\pi$, $S_x = d/4$, and the interference measurement device provided by the present disclosure has a 4-fold optical subdivision.

The optical path in the y-z direction in the bidirectional Littrow two-degree-of-freedom grating interference measurement device based on double gratings provided in this specific embodiment is shown in FIG. 2b. The optical path of the Y-direction measurement laser beam passing through the transmission two-dimensional grating 2, the reflection two-dimensional grating 3 and the Y-direction quarter-wave plate 5, the method of generating the corresponding diffracted light from the Y-direction measurement laser beam, and the method performed by the third optical system and the fourth optical system for the corresponding diffracted light are consistent with the method performed by the first optical system and the second optical system. A displacement change of the reflection two-dimensional grating 3 in the Y direction may be obtained according to:

$$S_y = \frac{d}{8\pi} \cdot \phi.$$

In a process of performing a displacement detection, in order to prevent other diffracted light and reflected light from interfering with a detection result, all light other than the light mentioned above is removed by blocking.

Second Specific Embodiment

Figure 3:
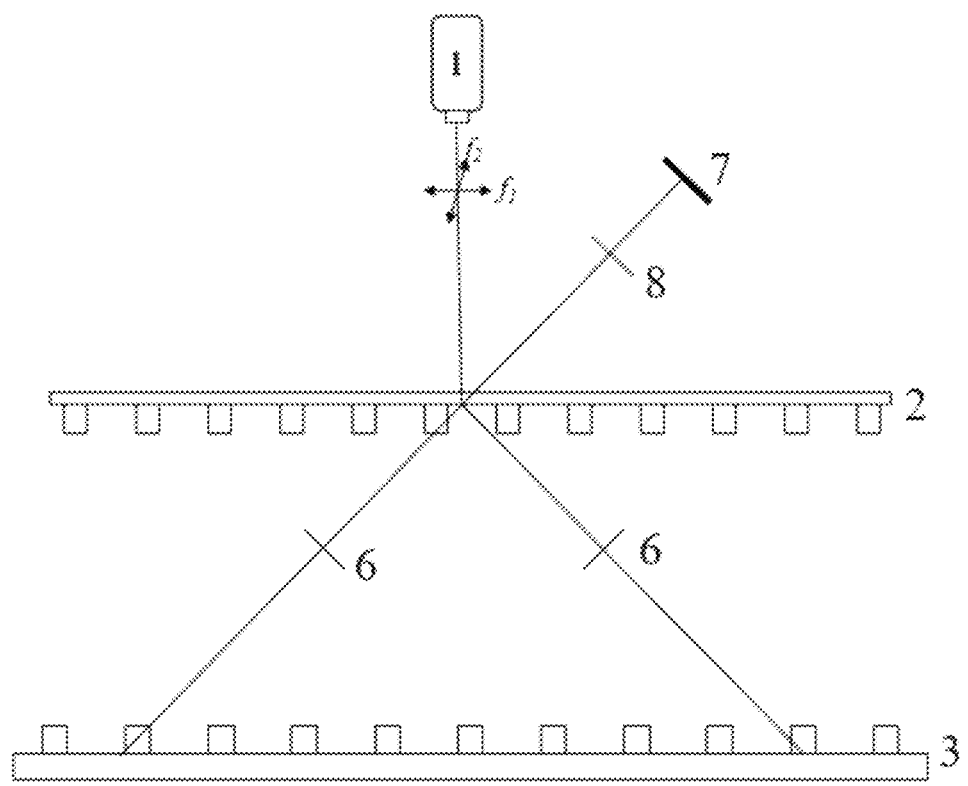
FIG. 3 shows a schematic diagram of a principle of a bidirectional Littrow two-degree-of-freedom grating interference measurement device based on double gratings in which a polaroid sheet is replaced by a polarizer according to an embodiment of the present disclosure.

FIG. 3 shows a principle of a bidirectional Littrow two-degree-of-freedom grating interference measurement device based on double gratings in which a polarizer is used.

As shown in FIG. 3, the polaroid sheet 6 is replaced by a polarizer 8, and the polaroid sheet 6 is placed between the transmission two-dimensional grating 2 and the reflection two-dimensional grating 3. In this case, two optical systems each consisting of a polarizer 8 and a photodetector 7 are required to receive stable interference light in the X direction and stable interference light in the Y direction respectively.

The $+1^{st}$ order diffracted light obtained by vertically injecting the X-direction measurement laser beam into the transmission two-dimensional grating 2 is incident on the reflection two-dimensional grating 3 at a Littrow angle to obtain new $+1^{st}$ order diffracted light. In this process, the $+1^{st}$ order diffracted light passes through the polaroid sheet 6 to filter out $+1^{st}$ order diffracted light having the frequency $f_1$, and only $+1^{st}$ order diffracted light having the frequency $f_2$ is retained. The new $+1^{st}$ order diffracted light returns to the transmission two-dimensional grating 3 in a direction of the $+1^{st}$ order diffracted light to obtain X-direction diffracted light.

The $-1^{st}$ order diffracted light obtained by vertically injecting the X-direction measurement laser beam into the transmission two-dimensional grating 2 is incident on the reflection two-dimensional grating 3 at a Littrow angle to obtain new $-1^{st}$ order diffracted light. In this process, the $-1^{st}$ order diffracted light passes through another polaroid sheet 6 to filter out new $-1^{st}$ order diffracted light having the frequency $f_2$, and only new -1st order diffracted light having the frequency $f_1$ is retained. The new $-1^{st}$ order diffracted light returns to the transmission two-dimensional grating 2 in a direction of the $-1^{st}$ order diffracted light, and $+2^{nd}$ order diffracted light is obtained after diffraction by the transmission two-dimensional grating. The $0^{th}$ order diffracted light and the $+2^{nd}$ order diffracted light in the X-direction diffracted light pass through the polarizer 8 to form stable interference light carrying a displacement information, and the stable interference light is received by the photodetector 7. The interference signal may be processed by the photodetector to obtain the displacement information of the grating in the X direction. Similarly, the displacement information of the grating in the Y direction may be obtained.

The optical path in the y-z direction in the bidirectional Littrow two-degree-of-freedom grating interference measurement device based on double gratings provided in this specific embodiment is consistent with the optical path in the x-z direction in this specific embodiment.

The optical path of the Y-direction measurement laser beam passing through the transmission two-dimensional grating 2, the reflection two-dimensional grating 3 and the polaroid sheet 6, the method of generating the corresponding diffracted light from the Y-direction measurement laser beam, and the method performed by the third optical system and the fourth optical system for the corresponding diffracted light are consistent with the method performed in the first optical system and the second optical system, and the displacement information of the reflection two-dimensional grating in the Y direction may be obtained.

In a process of performing a displacement detection, in order to prevent other diffracted light and reflected light from interfering with a detection result, all light other than the light mentioned above is removed by blocking.

The above specific embodiments do not constitute limitations on the protection scope of the present disclosure. It should be understood by those skilled in the art that various modifications, combinations, sub-combinations and substitutions may be made according to design requirements and other factors. Any modifications, equivalent substitutions and improvements made within the spirit and principles of the present disclosure should be included in the protection scope of the present disclosure.

What is claimed is:

1. A bidirectional Littrow two-degree-of-freedom grating interference measurement device based on double gratings, comprising a light source, a transmission two-dimensional grating, a reflection two-dimensional grating, an X-direction quarter-wave plate, a Y-direction quarter-wave plate, a first optical system, a second optical system, a third optical system, and a fourth optical system, wherein the light source is a dual-frequency laser configured to generate X-direction measurement laser beams with frequencies f1 and f2 respectively that have mutually perpendicular polarization states and Y-direction measurement laser beams with frequencies f1 and f2 respectively that have mutually perpendicular polarization states;

$+1^{st}$ order diffracted light obtained by vertically injecting the X-direction measurement laser beam into the transmission two-dimensional grating passes through the X-direction quarter-wave plate and is incident on the reflection two-dimensional grating at a Littrow angle to obtain new $+1^{st}$ order diffracted light, and the new $+1^{st}$ order diffracted light passes through the X-direction quarter-wave plate and returns to the transmission two-dimensional grating in a direction of the $+1^{st}$ order diffracted light to obtain $0^{th}$ order diffracted light and $-2^{nd}$ order diffracted light, so that horizontal polarization light having the frequency f1 in the $0^{th}$ order diffracted light and the $-2$nd order diffracted light generated by the new $+1^{st}$ order diffracted light is converted into vertical polarization light, and vertical polarization light having the frequency f2 in the $0^{th}$ order diffracted light and the $-2^{nd}$ order diffracted light generated by the new $+1^{st}$ order diffracted light is converted into horizontal polarization light;

$-1^{st}$ order diffracted light obtained by vertically injecting the X-direction measurement laser beam into the transmission two-dimensional grating is incident on the reflection two-dimensional grating at a Littrow angle to obtain new $-1^{st}$ order diffracted light, and the new $-1^{st}$ order diffracted light returns to the transmission two-dimensional grating in a direction of the $-1^{st}$ order diffracted light to obtain $0^{th}$ order diffracted light and $-2^{nd}$ order diffracted light after diffraction by the transmission two-dimensional grating;

the first optical system is configured to filter out a stable interference signal of a horizontal component in the $-2^{nd}$ order diffracted light generated by the new $+1^{st}$ order diffracted light and the $0^{th}$ order diffracted light generated by the new $-1^{st}$ order diffracted light, so that diffracted light of a vertical component having the frequency f2 and diffracted light of the vertical component having the frequency $f_1$ form a stable interference;

the second optical system is configured to filter out a stable interference signal of a vertical component in the $-2^{nd}$ order diffracted light generated by the new $-1^{st}$ order diffracted light and the $0^{th}$ order diffracted light generated by the new $+1^{st}$ order diffracted light, so that diffracted light of a horizontal component having the frequency $f_2$ and diffracted light of the horizontal component having the frequency $f_1$ form a stable interference; and a stable interference signal obtained in the first optical system and a stable interference signal obtained in the second optical system are processed by a photodetector to obtain a displacement change of the reflection two-dimensional grating in the X direction.

2. The bidirectional Littrow two-degree-of-freedom grating interference measurement device based on double gratings according to claim 1, wherein a phase change dx caused by a displacement of the reflection two-dimensional grating in the X direction is obtained according to:

$$\phi_x = \frac{2\pi m \cdot S_x}{d};$$

wherein $S_x$ represents a theoretical displacement of the reflection two-dimensional grating in the X direction, m represents an order of the diffracted light obtained after the X-direction measurement laser beam has passed through the transmission two-dimensional grating, and d represents a grating pitch of the transmission two-dimensional grating and the reflection two-dimensional grating;

when the order m is equal to +1 and −1 respectively, a Doppler frequency shift phase value $\phi_1$ of the $+1^{st}$ order diffracted light and a Doppler frequency shift phase value $\phi_2$ of the $-1^{st}$ order diffracted light are obtained according to:

$$\begin{cases} \phi_1 = \frac{2\pi \cdot S_x}{d} \\ \phi_2 = -\frac{2\pi \cdot S_x}{d} \end{cases} ; \text{ and}$$

A displacement change $S_x$ of the reflection two-dimensional grating in the X direction is obtained according to:

$$S_x = \frac{d}{8\pi} \cdot \phi;$$

wherein $\phi$ represents the phase change of the $+1^{st}$ order diffracted light and the $-1^{st}$ order diffracted light; and when the phase change $\phi$ is $2\pi$, $S_x = d/4$.

3. The bidirectional Littrow two-degree-of-freedom grating interference measurement device based on double gratings according to claim 2, wherein a displacement change $S_y$ of the reflection two-dimensional grating in the Y direction is obtained according to:

$$S_y = \frac{d}{8\pi} \cdot \phi.$$

4. The bidirectional Littrow two-degree-of-freedom grating interference measurement device based on double gratings according to claim 1, wherein the first optical system and the third optical system have the same structure each comprising a polaroid sheet configured to remove the stable interference signal of the horizontal component and a photodetector configured to receive the stable interference signal of the vertical component; and the second optical system and the fourth optical system have the same structure each comprising a polaroid sheet configured to remove the stable interference signal of the vertical component and a photodetector configured to receive the stable interference signal of the horizontal component.

* * * * *